United States Patent [19]

Buschbom et al.

[11] 4,369,855
[45] Jan. 25, 1983

[54] FLUID DRIVE SYSTEM

[75] Inventors: Floyd E. Buschbom, Long Lake, Minn.; Marion Hutchison, Waterloo, Iowa

[73] Assignee: Veda, Inc., Long Lake, Minn.

[21] Appl. No.: 169,191

[22] Filed: Jul. 15, 1980

[51] Int. Cl.³ .................... B60K 17/10; F15B 18/00
[52] U.S. Cl. ................................ 180/212; 60/421; 180/6.3; 180/6.48; 180/242; 417/218
[58] Field of Search ............ 180/211, 212, 213, 215, 180/6.3, 6.48, 242; 60/420, 421, 426, 484; 417/218

[56] References Cited

U.S. PATENT DOCUMENTS

| | | | |
|---|---|---|---|
| 2,272,603 | 2/1942 | Ellis | 180/26 |
| 2,651,377 | 9/1953 | Lapsley et al. | 180/6.3 |
| 2,949,971 | 8/1960 | Cline | 180/6.3 |
| 3,156,313 | 11/1964 | Peterson | 180/6.48 |
| 3,234,856 | 2/1966 | Martin | 91/413 |
| 3,246,715 | 4/1966 | Pool et al. | 180/44 |
| 3,469,381 | 9/1969 | Burrough et al. | 180/6.3 |
| 3,576,106 | 4/1971 | Nowicki | 60/426 |
| 3,727,929 | 4/1973 | Kieth et al. | 60/444 |
| 3,789,929 | 2/1974 | Leidig | 172/798 |
| 3,901,339 | 8/1975 | Williamson | 180/6.48 |
| 3,963,084 | 6/1976 | Misan | 180/26 |
| 4,116,294 | 9/1978 | Johnston | 180/242 |
| 4,167,853 | 9/1979 | Hamma et al. | 60/329 |

Primary Examiner—David M. Mitchell
Assistant Examiner—Donn McGiehan
Attorney, Agent, or Firm—Burd, Bartz & Gutenkauf

[57] ABSTRACT

A hydraulic fluid drive for a land motor vehicle having front and rear drive wheels. An internal combustion engine drives a pair of positive displacement pumps. A first pump is connected to hydraulic motors that drive the front wheels of the vehicle. A second pump is connected to a hydraulic motor that drives a rear steerable wheel of the vehicle. A manually operated control is used to adjust the speed and torque of the motors for the front wheels. A front and rear wheel drive equalizing control operates in response to differences in hydraulic fluid pressure supplied to the front and rear hydraulic motors to equalize the fluid pressure pumped to the front and rear hydraulic motors so as to maintain the torque and speed of the front and rear wheels substantially constant. A foot operated lever is used to operate the control for the first pump for changing the supply of fluid pressure to the front wheel motors. The control apparatus includes a piston and cylinder assembly that interconnects the controls for the first and second pumps to control the second pumps in response to the hydraulic fluid output pressure of the first pump.

27 Claims, 11 Drawing Figures

FLUID DRIVE SYSTEM

SUMMARY OF INVENTION

The invention relates to a fluid drive system for a land motor vehicle, as a tractor, truck, utility vehicle or the like, having a plurality of drive wheels. The drive system is embodied in a motor vehicle having separate front and rear drive wheel means. The system includes fluid driven motors operable to transmit substantially the same amount of torque to the front and rear drive wheel means. Automatically operating control means responsive to a difference in fluid pressure supplied to the front and rear fluid drive motors function to substantially equalize the pressure of the fluid supplied to the front and rear fluid drive motors. The fluid is pumped to the motors by positive displacement piston pumps driven by an internal combustion engine. A first pump operates to deliver fluid under pressure to first motor means drivably connected to the front drive wheels. A second pump operates to deliver fluid under pressure to motor means drivably connected to the rear wheel means. Each motor means has positive displacement means. The motor means for the front drive wheels has cam means operable to control the operation of the positive displacement means so that the speed and torque of the front wheel motor means can be changed by the operator of the vehicle.

Each pump has a movable control arm that is operable to vary the output flow of fluid from the pump. A piston and cylinder assembly connected to the control arms operates to automatically change the position of one of the arms in response to a differential pressure in the fluid developed by the first and second pumps for operating the motors for the front and rear wheels. A manually operated means connected to one of the control arms is operable to control the position of both control arms so that the first and second pumps concurrently operate to deliver substantially the same flow of fluid to the front and rear wheel fluid driven motors. The piston and cylinder assembly transmits the force from the manually operated means to the second control arms.

A by-pass valve is incorporated in the fluid circuit connecting the first pump with the fluid driven motors operable to drive the front wheels. The by-pass valve is normally closed so that the fluid from the first pump normally operates the front wheel fluid driven motors. A steering means associated with the rear wheel actuates a valve control or switch means operable on turning of the rear wheel a substantial amount, such as 80 or more degrees relative to the longitudinal axis of the vehicle. When the valve control is actuated the by-pass valve is opened so that the vehicle is only driven by the rear wheel. This allows the vehicle to make a sharp turn with one of the front wheels turning in a reverse direction, while the other front wheel turns in a forward direction.

An object of the invention is to provide a control for a fluid power transmission having a control for separate fluid motors associated with separate pumps operable to provide fluid under pressure to the motors to alter the torque and speed of one of the motors in response to a differential pressure delivered to the motors by the separate pumps. Another object of the invention is to provide control means for operating control arms of separate pumps in response to differences in fluid pressure developed by the pumps. A further object of the invention is to provide a drive system for a motor vehicle which disengages the drive to some of the vehicle wheels in response to the sharp turning of the vehicle. These and other objects and advantages of the invention are hereinafter shown and described.

DESCRIPTION OF PREFERRED EMBODIMENT

Figure 1:
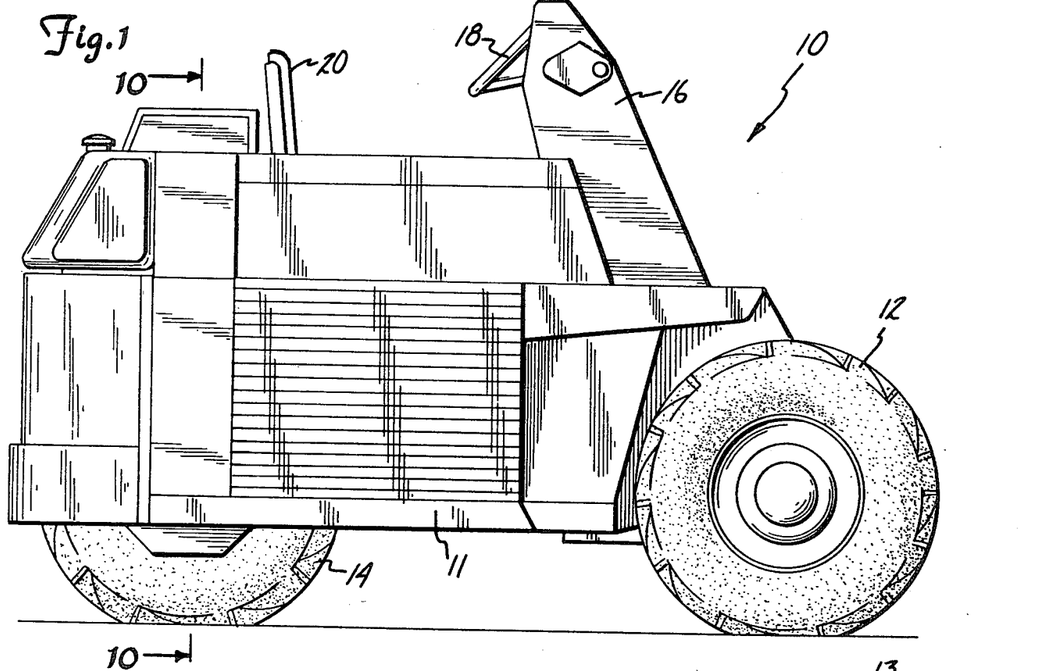
FIG. 1 is a side elevational view of a land motor vehicle of the invention.
Figure 2:
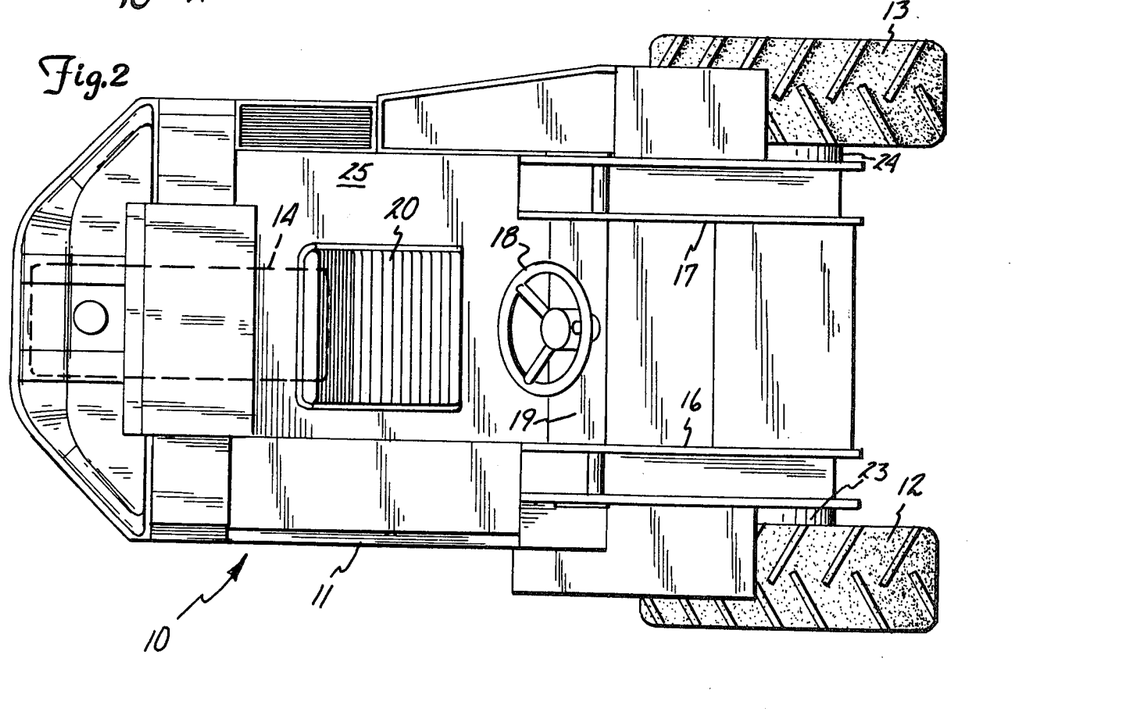
FIG. 2 is a top plan view of FIG. 1.

Referring to FIGS. 1 and 2, there is shown a motor vehicle indicated generally at 10. Vehicle 10 is an all-wheel drive machine having a frame 11, a pair of front drive wheels 12 and 13, and a rear drive steerable wheel 14. A pair of upright posts 16 and 17 are connected to the front of frame 11. Posts 16 and 17 are adapted to be connected to arms and like structures associated with buckets or forks to carry and transport a load, such as material, including, but not limited to, feed, sand, coal, fertilizer, earth, and the like. A steering wheel 18 rotatably mounted on a panel or transverse portion 19 secured to posts 16 and 17 is used to control the vertical turning of steerable wheel 14. A seat 20 is located on a deck or floor 25 behind steering wheel 18.

Figure 3:
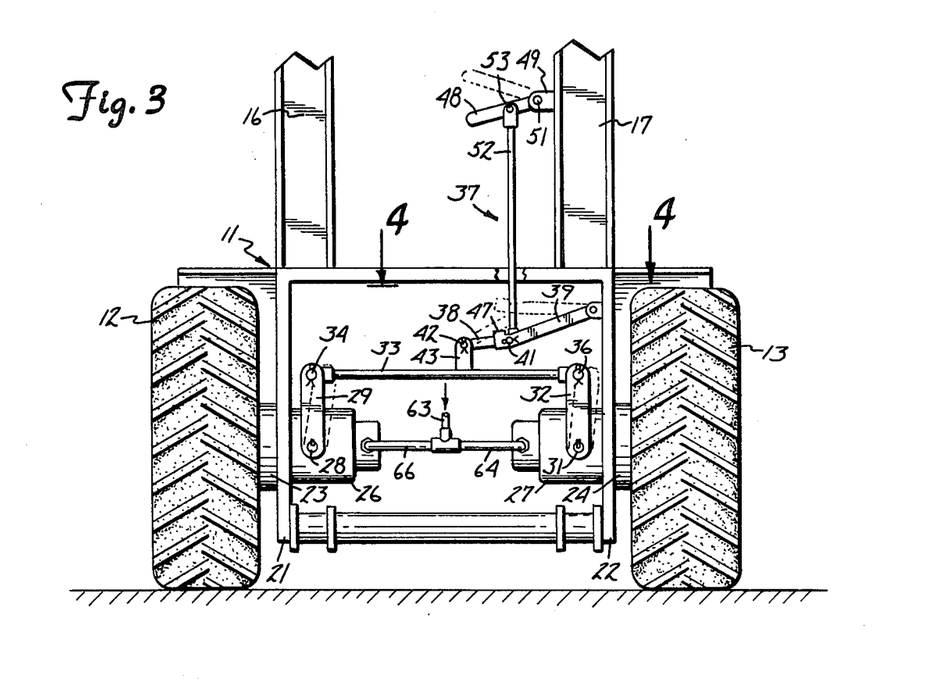
FIG. 3 is a foreshortened front elevational view of FIG. 1.

Referring to FIG. 3, frame 11 has longitudinal side plates 21 and 22. Front wheels 12 and 13 are drivably connected to gear drives 23 and 24, respectively, mounted on side plates 21 and 22. A first motor 26 connected to gear drive 23 operates to transmit power to the gear drive 23. A second motor 27 mounted on gear drive 24 transmits power thereto. Gear drives 23 and 24 can be planetary gear transmissions. Other types of power transmissions can be used to couple motors 26 and 27 to wheels 12 and 13. Motors 26 and 27 are operated by fluid under pressure. The term fluid refers to hydraulic fluid, pneumatic fluid, or steam.

Motors 26 and 27 are variable displacement axial piston hydraulic fluid motors having controlled cams to vary the stroke of the pistons. The motors can be Vickers MV-19 hydraulic motors made by Sperry-Vickers, Troy, Michigan. Motor 26 has a control shaft 28 for controlling the position of the cam or swash-plate. A generally upright arm 29 attached to shaft 28 is movable to rotate shaft 28 and thereby change the position of the cam in the motor. Motor 27 has a control shaft 31 for controlling its cam which, in turn, is used to vary the stroke of the pistons in the motor. An upright arm 32 is fixed to shaft 31. The upper free ends of arms 29 and 32 are connected with a generally horizontal tie rod 33. Pivot pins 34 and 36 pivotally connect the outer ends of arms 29 and 32 to opposite ends of rod 33 whereby the arms 29 and 32 move together to simultaneously change the speed and torque of the hydraulic motors 26 and 27. The arms 29 and 32 are normally located in a position wherein the hydraulic fluid motors 26 and 27 are in half stroke. The tie rod 33 is movable in a direction to move the arms 29 and 32 from their normal half stroke positions to their full stroke positions.

Figure 4:
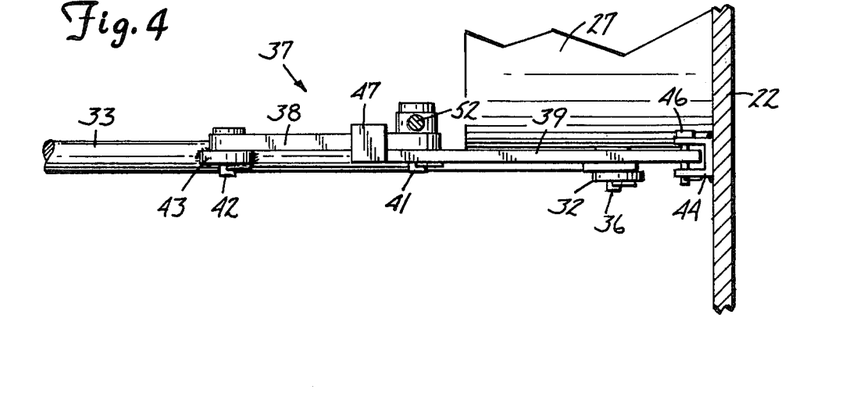
FIG. 4 is an enlarged sectional view taken along the line 4—4 of FIG. 3.

A manually operated control indicated generally at 37 operatively connected to rod 33 functions to move rod 33 and thereby simultaneously move arms 29 and 32 to concurrently adjust the strokes of the pistons in the motors 26 and 27, thereby controlling the speed and torque delivered by each motor 26 and 27. As shown in FIG. 4, control 37 has an over-center linkage comprising a first link 38 and a second link 39 pivoted together with a pivot bolt 41. First link 38 is pivotally connected with a bolt or pivot pin 42 to an upright ear 43 secured to rod 33. Second link 39 has an outer end pivoted with a bolt 46 to a bracket 44 secured to side plate 22 with a weld or the like. The inner end of second link 39 has a stop or projection 47 adapted to engage a portion of the first link 38 to hold the linkage in an over-center position, as shown in FIG. 3. When over-center linkage is in its down or over-center position, the arms 29 and 32 are held in their half stroke positions.

A hand lever 48 is pivotally connected to the inside of post 17 with a bracket 49. A pivot pin 51 pivotally connects the inner end of lever 48 to bracket 49. Lever 48 is connected to toggle link bolt 41 with a push-pull link or rod 52. A pivot pin 53 pivotally connects the upper end of the rod to lever 48. Lever 48 can be provided with releasable position holding or lock structure (not shown) operable to hold the lever in a selected position thereby holding motor control arms 29 and 32 in selected positions. Thus, motors 26 and 27 can be adjusted to operate in any desired position from half stroke to full stroke piston displacement.

In use, when lever 48 is in the down position, as shown in full lines in FIG. 3, toggle links 38 and 39 are in their over-center positions. This locates arms 29 and 32 at their half-stroke positions. When hand lever 48 is moved to the up position, as shown in broken lines, toggle links 38 and 39 break open moving the tie rod 33 to the left, thereby moving the arms 29 and 32 and repositioning the cams in the fluid motors 26 and 27 to allow for full stroking of the pistons. This reduces the speeds of the motors 26 and 27 and increases their torque or power output.

Figure 5:
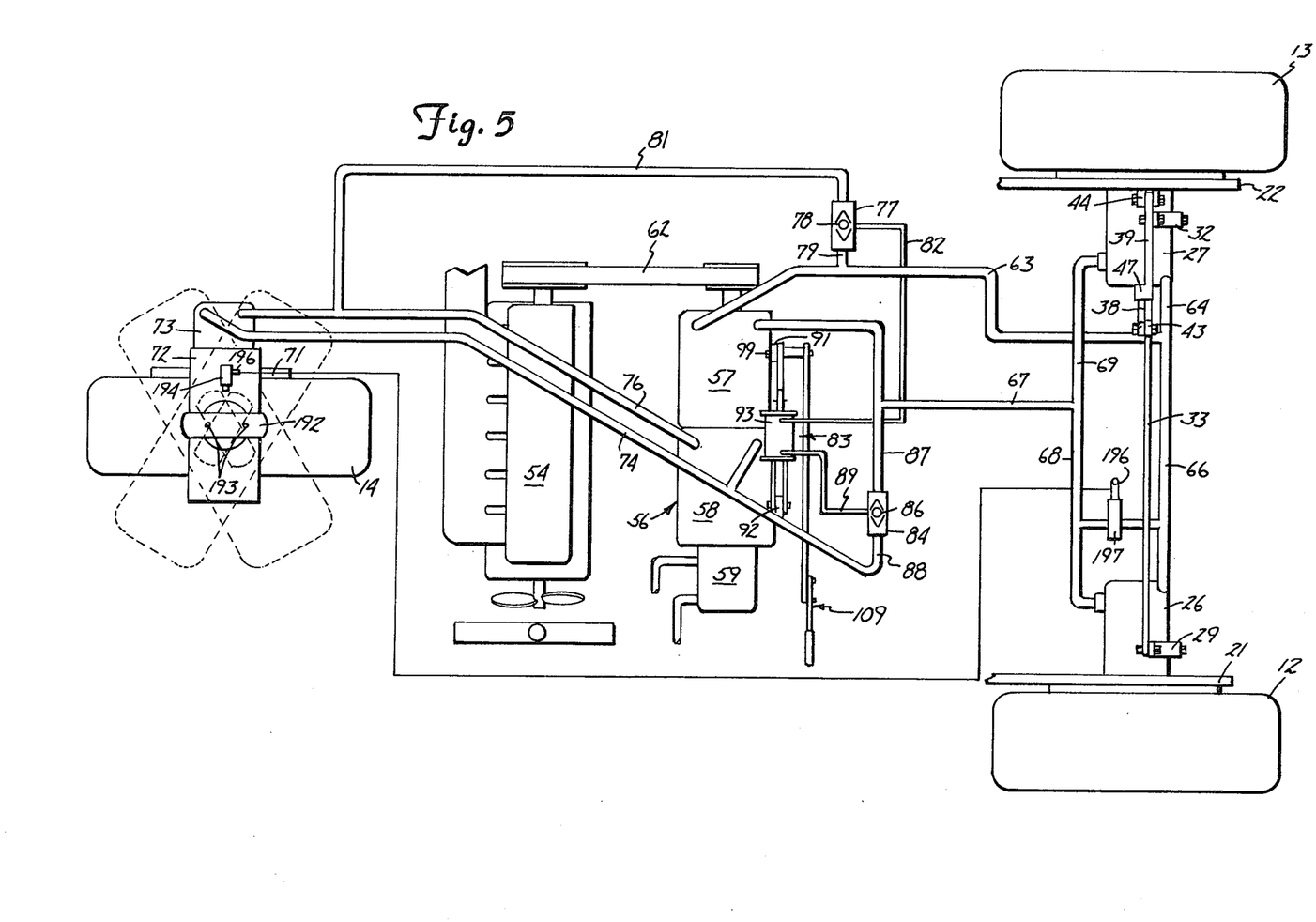
FIG. 5 is a diagrammatic view of the fluid drive system for powering the vehicle of FIG. 1.

The diagrammatic view of the hydraulic power system is shown in FIG. 5. The primary power is derived from an internal combustion engine 54. Engine 54 drives a pump assembly 56 comprising first, second, and third pumps 57, 58, and 59. Pump assembly 56 has a drive shaft 61 drivably connected to engine 54 with a belt and pulley power transmission 62. The common drive for pumps 57 and 58 eliminates the need of a splitter gear box to distribute engine power to the front and rear wheels.

First pump 57 is operable to supply hydraulic fluid under pressure to hydraulic motors 26 and 27 drivably connected to front wheels 12 and 13. The hydraulic fluid under pressure flows through a line 63 into branch lines 64 and 66 connected to motors 26 and 27, respectively. A second line 67 connects pump 57 to motors 26 and 27. Line 67 is joined with branch lines 68 and 69 leading to motors 26 and 27. When pump 57 delivers hydraulic fluid under pressure to line 63 motors 26 and 27 drive wheels 12 and 13 in a forward direction. The hydraulic fluid flows from motors 26 and 27 via line 67 back to the pump or a suitable reservoir. When pump 57 delivers hydraulic fluid under pressure to line 67 the motors 26 and 27 drive the wheels 12 and 13 in the reverse direction. The return flow is through line 63. Motors 26 and 27 are connected in parallel in a first fluid circuit having pump 57.

Second pump 58 is operable to supply hydraulic fluid under pressure to a hydraulic motor 73 operable to drive rear steerable wheel 14. Motor 73 and pump 58 are connected in a second fluid circuit. Wheel 14 is operatively connected to a gear drive 71 mounted on a support member 72. Support member 72 is part of the structure that is used to turn wheel 14 about a generally upright axis and thereby steer the vehicle. A first line 74 connects pump 58 to motor 73. A second line 76 also connects pump 58 to motor 73 whereby the pump 58 is operable to selectively drive motor 73 in forward and reverse directions. Motor 73 is a positive displacement piston hydraulic motor of the same size and type as motors 26 and 27. Motor 73 operates as full stroke. With front motors 26 and 27 operating at half stroke and rear motor 73 operating at full stroke, substantially the same torque is applied to the two front wheels 12 and 13 and rear wheel 14.

In the normal operating mode, the piston displacement of each front motor 26 and 27 is about one-half the piston displacement of the rear motor 73. The torque developed by the rear motor 77 is about double or twice the torque developed by each front motor. The total torque applied to both front wheels 12 and 13 is about equal to the torque applied to the rear wheel. When front motors 26 and 27 are at full stroke or full piston displacement (low range), the piston displacement of the combined front motors 26 and 27 is about twice the piston displacement of rear motor 73. Under these conditions, the pump 57 would be operated at fully stroke or piston displacement and rear pump 58 operates at one-half stroke or piston displacement to balance the fluid pressure in the first and second fluid circuits.

A first flow control valve 77 having a moving valving member or shuttle ball 78 is connected to a line 79 joined with line 63. Valve 77 is connected with line 81 to line 76. A third line 82 connects valve 77 with a control piston and cylinder unit 83 hereinafter described. Ball 78 is responsive to differences in fluid pressures in lines 63 and 76 to deliver fluid under pressure to line 82. When the fluid pressure in line 63 is greater than the fluid pressure in line 76, the shuttle ball 78 will move to the left blocking the flow of fluid to line 81. The fluid flows through line 82 to the piston and cylinder unit 83. Unit 83 operates to increase the flow and pressure of the second pump 58 thereby increasing the fluid pressure in line 76 until the fluid pressure in lines 63 and 76 is substantially equal.

A second flow control valve 84 having a shuttle ball 86 is connected with line 87 to line 67 with line 88 to line 74. A third line 89 connects valve 84 to the control piston and cylinder unit 83. Control valve 84 functions when the vehicle is driven in the reverse direction. When the fluid in line 67 is greater than the pressure of the fluid in line 74, shuttle ball 86 blocks the flow of fluid to line 88. The fluid flows from valve 84 via line 89 to the piston and cylinder unit 83 which moves the control for the second pump 58 to a position to increase the pressure of the fluid delivered to line 74 until the fluid pressure in lines 67 and 74 is substantially equal. Valves 77 and 84 function to equalize the fluid pressure delivered to the front motors 26 and 27 with the rear motor 73 in both the forward and reverse directions. When the pressure of the hydraulic fluid delivered to the front motors 26 and 27 and the pressure of the hydraulic fluid delivered to the rear motor 73 is substantially equal, the power or torque and speed delivered by motors 26, 27 and motor 73 to front wheels 12 and 13 and rear wheel 14 is substantially equal.

Pumps 57 and 58 are variable displacement axial piston hydraulic fluid transmission units. Pumps 57 has an upwardly directed control arm 91. Pump 58 has an upwardly directed control arm 92. Control arms 91 and 92 are movable to change the position of internal cams to vary the stroke of the pump pistons to control the rate and direction of flow of hydraulic fluid delivered by the pumps. The arms 91 and 92 are angularly movable from a central neutral position to a right or reverse position and a left or forward position. Pumps 57 and 58 are identical units. They can be Vickers TA-19 positive displacement piston pumps made by the Sperry-Vickers, Troy, Michigan. These pumps are known as swashplate pumps, which have a rotating body carrying pistons cooperating with the adjustable cam plate to vary the output capacity of the pump. A variable displacement pump of the axial piston type is shown in FIG. 24, Chapter 14, page 14 of *Mark's Standard Handbook for Mechanical Engineers,* 7th Edition, McGraw-Hill Book Co., 1958.

Figure 6:
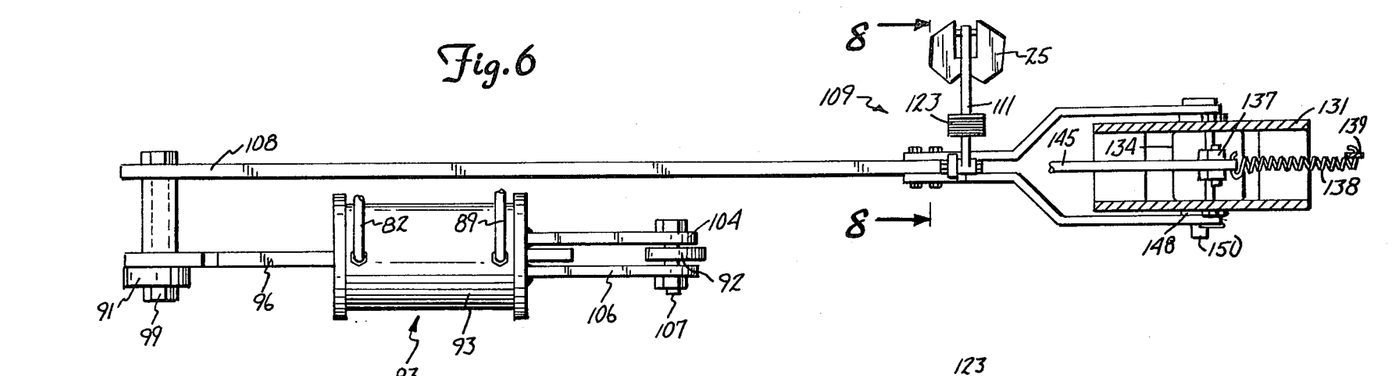
FIG. 6 is an enlarged top view of the control apparatus for the front wheel and rear wheel pumps.
Figure 7:
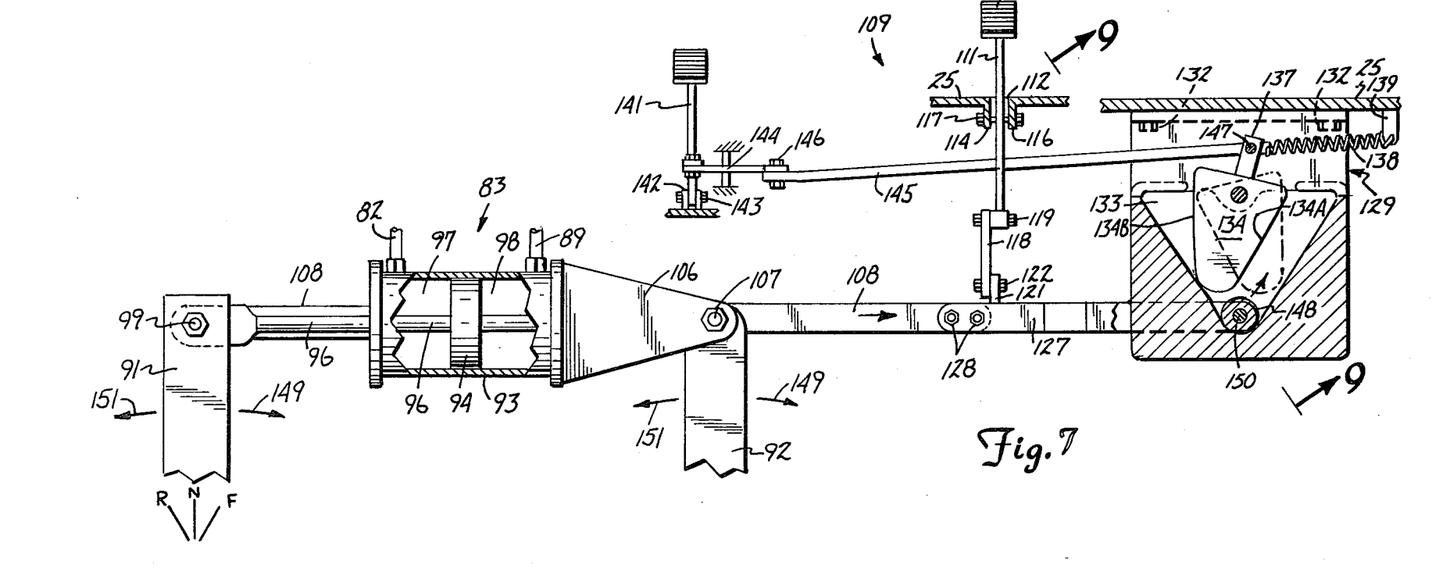
FIG. 7 is a side elevational view of FIG. 6.

Referring to FIGS. 6 and 7, control piston and cylinder unit 83 has a cylindrical housing 93 accommodating a linearly movable piston 94. Piston 94 is mounted on a piston rod 96 extended axially through cylindrical housing 93. Piston 94 separates the chamber of the cylinder member into a first chamber 97 and a second chamber 98. Line 82 is in communication with chamber 97. Line 89 is in communication with chamber 98. A pivot pin 99 pivotally connects the upper end of arm 91 and rod 96. A pair of ears 104 and 106 fixed to an end of cylindrical member 93 are pivotally connected to the upper end of arm 92 with a pivot bolt 107. Bolt 99 is also pivotally accommodating a linear rod or bar 108 leading to a manual control apparatus indicated generally at 109. Control apparatus 109 functions in response to a foot control to move the lever 91 and thereby control the fluid output of the pump 57. Piston and cylinder unit 83 connected to levers 91 and 92 moves lever 92 concurrently with the movement of lever 91. The lever 92 is moved relative to lever 91 in response to an increase of the pressure of the fluid in either one of the chambers 97 or 98.

Cylinder unit 83 allows only a limited amount of relative movement of pump arms 91 and 92. This relative movement is insufficient to allow the second or rear pump to operate at half stroke. This condition is used when loading a bucket or vehicle under a heavy load. The added torque applied to the rear wheels 14 does not deter from the operation of the vehicle. The limit of the stroke of cylinder unit 83 or relative movement between piston 94 and cylinder 93 of cylinder unit 83 enables the operator to override the automatic operation of cylinder unit 83.

In the event that one or both front wheels 12 and 13 are raised off the ground or engage a slippery surface, as ice, they will freely rotate or spin. This causes the fluid pressure to drop in the first or front wheel fluid circuit. Cylinder unit 83 automatically operates to balance the fluid pressure in the front and rear fluid circuits. This will reduce the torque of the rear wheel drive motor 73. Under these conditions, the operator pushes the pedal 123 to the floor 25 to override the automatic control function of cylinder 83 and move the pump arm 92 of the rear pump 58 to full stroke, so that pump 58 supplies rear motor 73 with fluid under pressure, whereby motor 73 operates to apply torque to rear wheel 14.

Figure 8:
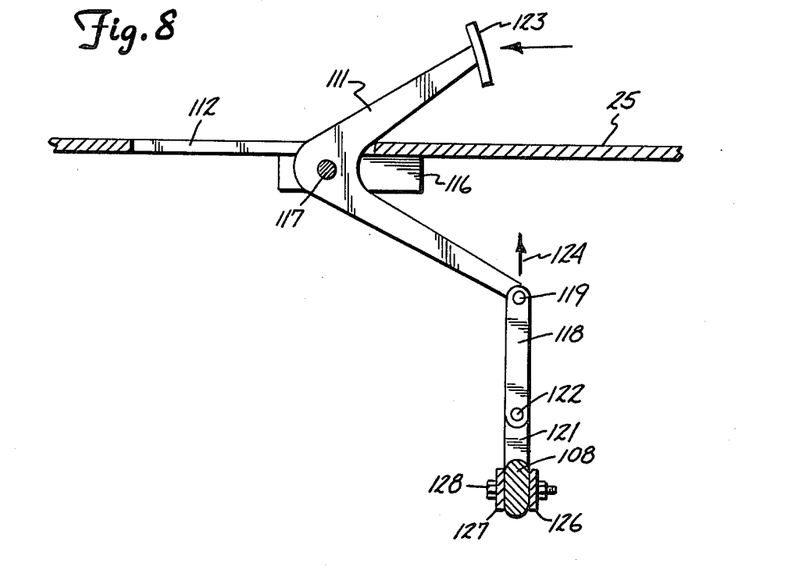
FIG. 8 is an enlarged sectional view taken along the line 8—8 of FIG. 6.
Figure 9:
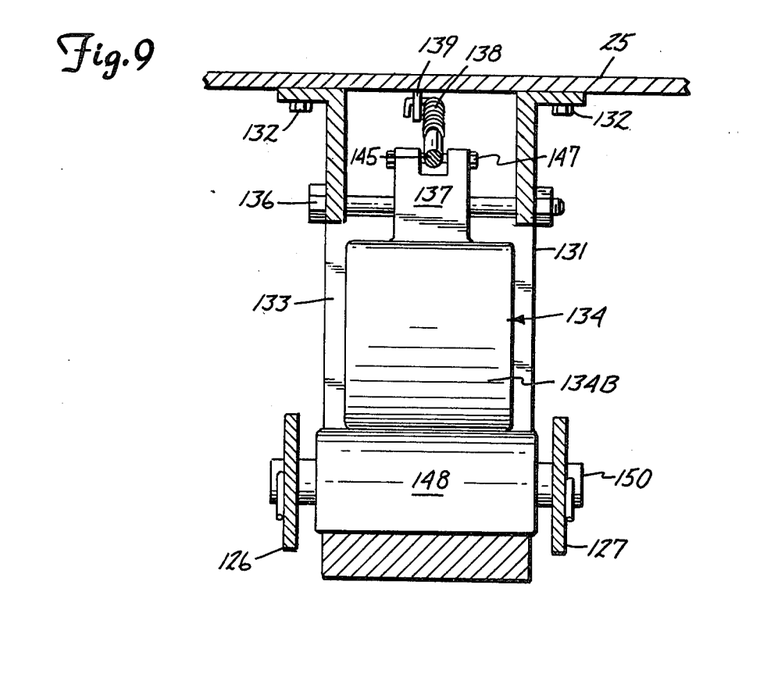
FIG. 9 is an enlarged sectional view taken along the line 9—9 of FIG. 7.

Referring to FIGS. 7 and 8, manual control or apparatus 109 includes a bell crank 111 extended through a slot 112 in the floor 25 located over pump assembly 56. A pair of brackets 114 and 116 are secured to the bottom of floor 25 carry the transverse pivot pin 117 that pivotally connects bell crank 111 to brackets 114 and 116. The lower end of crank arm 111 is pivotally connected to a downwardly directed link 118 with a pivot pin 119. The lower end of link 118 is pivotally connected to a tab 121 with a pivot pin 122. The tab 121 is joined to a pair of bars 126 and 127 connected to rod 108 with bolts 128. A roller 148 is rotatably mounted on the outer ends of bars 126 and 127. A foot pedal 123 is secured to the upper end of bell crank 111.

In use, foot pedal 123 is adapted to be engaged by the foot of the operator to pivot the bell crank 111 in a counterclockwise direction. This moves the link 118 in an upward direction, as indicated by arrow 124 in FIG. 8. A motion control unit indicated generally at 129 operates in response to upward movement of rod 108 by manual control apparatus 109 to linearly move the rod 108 and thereby angularly move arms 91 and 92 to control the fluid output of pumps 57 and 58.

Motion control unit 129 has a housing 131 that is secured to the bottom of floor 25 with a plurality of bolts 132. Housing 131 has a triangular opening 133 accommodating a movable triangular shaped finger 134. The opening 133 and finger 134 both have lower apex portions. A pivot pin 136 pivotally mounts the finger 134 on housing 131. Pin 136 extends through an upwardly directed projection 137 on finger 134. A spring 138 connected to projection 137 and a fixed tab 139 biases finger 134 in its first position, as shown in full lines in FIG. 7.

A foot operated lever or foot pedal lever 141 pivoted on a bracket 142 with a pivot pin 143 operates to move finger 134 to a second position, as shown in FIG. 7 in dotted lines. Lever 141 is a bell crank pivoted to another bell crank 144 connected to projection 137 with a rod 145. Pivot pin 146 connects crank 144 to lever 141. Other types of linkages can be used to connect foot pedal lever 141 to rod 145 to linearly move rod 145 in response to pivotal movement of lever 141. Also, lever 141 can be a hand operated control. The opposite end of rod 145 accommodates a pivot pin 147 that is connected to projection 137.

In use, finger 134 is normally in the first position with the apex portion thereof in engagement with housing 131. A roller 148 rotatably mounted on the ends of bars 126 and 127 with pin 150 is located in the apex portion of opening 133 below finger 134. Finger 134 has first cam surface 134A which extends upwardly away from levers 91 and 92 so that when roller 148 is moved in an upward direction, it rides on cam surface 134A and moves pump control arms 91 and 92 in a clockwise direction, as indicated by the arrow 149. When lever 141 is depressed, rod 145 pulls finger 134 to its second broken line position, shown in FIG. 7, until the apex portion thereof engages housing 131. This locates the second cam surface 134B of the finger 134 in an upwardly and inwardly inclination so that on upward movement of roller 148 by the manual control apparatus 109 the roller 148 riding on cam surface 134B will move the pump control arms 91 and 92 in the counterclockwise or reverse direction, as shown by arrows 151. This reverses the supply of fluid to wheel drive motors 26, 27 and 73 so as to drive the vehicle in a backward direction. The vehicle will continue to move in the reverse direction as long as foot operated lever 123 is depressed.

Figure 10:
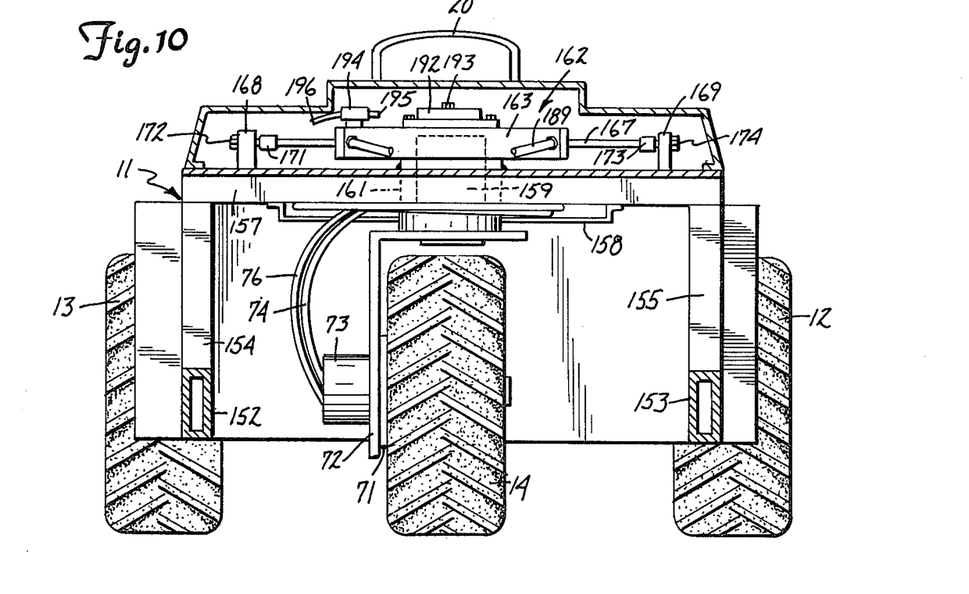
FIG. 10 is a sectional view taken along the line 10—10 of FIG. 1.

Referring to FIG. 10, vehicle frame 11 has a pair of longitudinal box beams 152 and 153 supporting upright members 154 and 155. A cross member 157 is attached to the upper ends of the upright members 154 and 156. Cross member 157 carries a support bracket 158 for the fluid lines or hoses 74 and 76 connected to the fluid operated motor 73. Hoses 74 and 76 are coiled about the upright or turning axis of wheel 14. Wheel support member 72 is secured to an upright cylindrical member or post 159 rotatably mounted on cross member 157 with a bearing 161.

Figure 11:
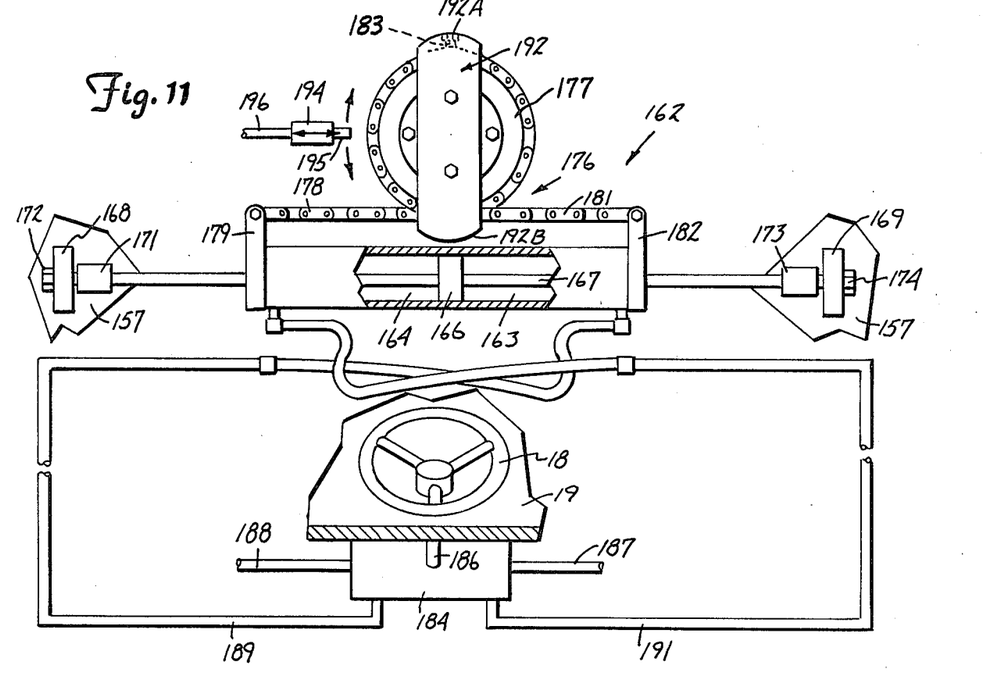
FIG. 11 is a diagrammatic view of the fluid power steering fluid drive apparatus for steering the vehicle of FIG. 1.

A power unit indicated generally at 162 is operable to rotate wheel 14 about the upright axis of post 159 to steer vehicle 10. Power unit 162, as shown in FIG. 11, comprises an elongated cylinder 163 having a chamber 164. A piston 166 slidably disposed in chamber 164 is secured to a linear piston rod 167. The left end of rod 167 is attached to a fixed support 168 with a sleeve 171 and bolt 172. The right end of 154 is attached to a fixed support 169 with a sleeve 173 and a bolt 174. Supports 168 and 169 are secured to cross member 157.

A motion transmission apparatus indicated generally at 176 operatively connects power unit 162 with a hub 177 so that on operation of the power unit the wheel 14 is rotated about the axis of the post. The motion transmitting apparatus is connected to a disc or hub 177 secured to the top of post 159. Apparatus 176 comprises a first chain 178 secured to an end block 179 on one end of cylinder 163 and a second chain 181 secured to an end block 182 and the opposite end of cylinder 163. Chains 178 and 181 extend around hub 177 in opposite directions and are attached to the hub with a bolt 183. Hydraulic fluid under pressure is supplied to the opposite ends of the chamber 164 in response to operation of a steering valve 184. Valve 184 mounted on panel 19 is operatively connected to steering wheel 18 with a steering shaft 186. Hydraulic fluid under pressure is supplied to valve 184 by auxiliary pump 59 via fluid input line 187. A return line 188 is used to return the fluid to a reservoir and inlet of pump 59. A pair of lines 189 and 191 connect the valve 184 to opposite ends of the cylinder 163. The details of steering valve 184 and the operation thereof are set out in the co-pending U.S. Application Ser. No. 165,745 filed July 3, 1980. The disclosure of this application is incorporated herein by reference.

As shown in FIGS. 5 and 11, a plate or arm 192 is attached to the top of hub 177 with a plurality of bolts 193. Plate 192 selectively actuates a control unit 194. Control unit 194 has an actuator 195 and is connected with a line 196 to a by-pass valve 197 located in fluid communication with lines 66 and 68 connected to the front wheel drive motors 26 and 27. Valve 197 is normally closed. When valve 197 is open, the fluid under pressure by-passes motors 26 and 27 so that the vehicle is only driven with rear wheel 14. When wheel 14 is turned about 80 degrees in either direction from the longitudinal position, as shown in broken lines in FIG. 5, ends 192A and 192B of plate 192 will engage actuator 195 and thereby operate control unit 194 to actuate by-pass valve 197 to open the fluid circuit between lines 64 and 69. This disengages the power to both front wheels 12 and 13 so that vehicle 10 can make a relatively sharp turn. When the vehicle makes a sharp turn, one of the front wheels moves in a forward direction, while the other wheel moves in a rearward direction. When by-pass valve 197 is open, one of the wheels can rotate in a reverse direction so as not to impede the sharp turning of the vehicle. Rear wheel 14 is the only wheel that drives the vehicle.

The control unit 194 can be a micro switch that is electrically coupled to a solenoid operated valve 197. The control unit 194 can be a hydraulic valve that is connected with hydraulic lines to a hydraulically operated by-pass valve 197.

While there is shown and described a fluid drive transmission in association with a three-wheeled land vehicle, it is understood that the drive system can be used with a four wheel drive land vehicle. Changes in parts, size of parts, pumps, and motors may be made by one skilled in the art without departing from the invention. The invention is defined in the following claims.

The embodiments of the invention in which an exclusive property or privilege is claimed are defined as follows:

1. A land vehicle comprising: a frame, first wheel means and second wheel means connected to the frame to support the frame on the ground, first drive means operably connected to the first wheel means to rotate said first wheel means, said first drive means having fluid operated first motor means, second drive means operably connected to the second wheel means, said second drive means having fluid operated second motor means, first pump means for supplying fluid under pressure to a first fluid circuit connected to the first motor means, second pump means for supplying fluid under pressure to a second fluid circuit connected to the second motor means, means for concurrently operating the first and second pump means whereby said first and second pump means supplies fluid under pressure to the first and second fluid circuits thereby operating said first and second motors to drive the first and second wheel means, said first and second pump means each having control means operable to vary the rate of flow of fluid discharged by the first and second pump means, means connected to the control means of the first and second pump means, and said means connected to the control means of the first and second pump means includes means operable in response to a difference in the pressure of the fluid in the first and second fluid circuits to actuate the control means of second pump means to alter the rate of flow of fluid discharged by the second pump means to substantially balance the pressure of the fluid in the first and second fluid circuits thereby maintaining the torque and speed input to the first and second drive wheel means substantially constant.

2. The vehicle of claim 1 wherein: the first wheel means includes a pair of front drive wheels, the first drive means includes a pair of fluid operated first motors operably connected to the pair of front drive wheels, each first motor having positive displacement means, and means for controlling the operation of said displacement means to vary the speed and torque of each of said first motors.

3. The vehicle of claim 2 wherein: the second motor means includes a second motor having positive displacement means, said second motor operable to provide torque to said second wheel means in an amount substantially the same as the torque developed by said first motors.

4. A land vehicle comprising: a frame, first wheel means and second wheel means connected to the frame to support the frame on the ground, first drive means operably connected to the first wheel means to rotate said first wheel means, said first drive means having fluid operated first motor means, second drive means operably connected to the second wheel means, said second drive means having fluid operated second motor means, first pump means for supplying fluid under pressure to a first fluid circuit connected to the first motor means, a second pump means for supplying fluid under pressure to a second fluid circuit connected to the second motor means, means for concurrently operating the first and second pump means whereby said first and second pump means supplies fluid under pressure to the first and second fluid circuits thereby operating said first and second motors to drive the first and second wheel means, said first and second pump means each having control means operable to vary the rate of flow of fluid discharged by the first and second pump means, means connected to the control means of one of the pump means operable to actuate the control means of said one of the pump means, and means operable in response to a difference in the pressure of the fluid in the first and second fluid circuits to actuate the control means of other pump means to alter the rate of flow of fluid discharged by the other pump means to substantially balance the pressure of the fluid in the first and second fluid circuits thereby maintaining the torque and speed input to the first and second drive wheel means substantially constant, said means operable in response to a difference in the pressure of the fluid in the first and second fluid circuits to actuate the control means of the other pump means to alter the rate of flow of fluid discharged by the other pump means includes a piston and cylinder assembly connected to the control means of both pump means, and shuttle valve means connected to both of said pump means to receive fluid under pressure therefrom and direct fluid to the piston and cylinder assembly, said shuttle valve means operable in response to a difference in fluid pressure in the first and second fluid circuits to selectively expand and contract the piston and cylinder assembly thereby operating the control means of the other pump means to alter the fluid flow rate of the other pump means in a manner to balance the pressure of the fluid in the first and second fluid circuits thereby maintaining the torque and speed input to the front and rear drive wheel means substantially constant.

5. The vehicle of claim 4 wherein: the first pump means and second pump means each comprise a variable displacement pump having positive displacement means, said control means being operatively connected to the displacement means whereby operation of the control means moves the displacement means to vary the rate of flow of fluid discharged by each pump.

6. The vehicle of claim 4 wherein: the means for concurrently operating the first and second pump means includes a motor and power transmission means connecting the motor with the first and second pump means.

7. The vehicle of claim 4 wherein: the first wheel means includes a pair of driven front wheels, said first drive means includes a first fluid operated motor drivably connected to one front wheel and a second fluid operated motor drivably connected to the other front wheel, each of said first and second motors having control means for changing the output speed and torque of the motor, means for concurrently operating said control means whereby said first and second motors have substantially the same output speed and torque.

8. The vehicle of claim 7 wherein: the control means for each of the first and second motors includes a movable arm, said means for concurrently operating said control means including rod means connected to each arm, and means to move the rod means to simultaneously move each arm thereby concurrently changing the output speed and torque of each motor.

9. The vehicle of claim 8 wherein: the means to move the rod means includes a toggle linkage connected to the rod means and frame, and means for selectively moving the toggle linkage to a first position and a second position, said toggle linkage when in the first position holding said arms in first positions and when moved from the first position to the second position moving said arms to second positions to decrease the speed of the motors and increase the torque thereof.

10. The vehicle of claim 9 wherein: said toggle linkage includes a pair of links pivoted together and pivotally connected to the rod means and frame, and stop means associated with said links to hold the links in an over-center first position.

11. A land vehicle comprising: a frame, first wheel means and second wheel means connected to the frame to support the frame on the ground, first drive means operably connected to the first wheel means to rotate said first wheel means, said first drive means having fluid operated first motor means, second drive means operably connected to the second wheel means, said second drive means having fluid operated second motor means, first pump means for supplying fluid under pressure to a first fluid circuit connected to the first motor means, a second pump means for supplying fluid under pressure to a second fluid circuit connected to the second motor means, means for concurrently operating the first and second pump means whereby said first and second pump means supplies fluid under pressure to the first and second fluid circuits thereby operating said first and second motors to drive the first and second wheel means, said first and second pump means each having control means operable to vary the rate of flow of fluid discharged by the first and second pump means, means connected to the control means of one of the pump means operable to actuate the control means of said one of the pump means, and means operable in response to a difference in the pressure of the fluid in the first and second fluid circuits to actuate the control means of other pump means to alter the rate of flow of fluid discharged by the other pump means to substantially balance the pressure of the fluid in the first and second fluid circuits thereby maintaining the torque and speed input to the first and second drive wheel means substantially constant, said means operable to actuate the control means of the other pump means includes a piston and cylinder unit operably connected to the control means of both of said pump means, and shuttle valve means connecting the unit with the fluid output of both of said pump means, said shuttle valve means being operable in response to a difference in fluid pressure of the first and second fluid circuits to supply fluid to said unit to control the fluid output of the other pump means in a manner to substantially balance the fluid pressure in the first and second fluid circuits.

12. The vehicle of claim 11 wherein: the means connected to the control means of the one pump means includes a manually operated lever, rod means connected to the lever and control means of the one pump means, and motion control means connected to the rod means operable to selectively control the movement of the rod means in opposite longitudinal directions.

13. The vehicle of claim 12 wherein: the motion control means includes a housing having a general triangular opening, finger means located in said opening, means operable to move said finger means to first and second positions in said opening, roller means connected to said rod means located in said opening, said roller means being engageable with said finger means in response to operation of the lever whereby the rod means is moved when the roller means engages and moves relative to the finger means.

14. The vehicle of claim 13 wherein: said finger means has an apex portion and diverging first and second side portions extended from the apex portion, said roller means engageable with the first side portion when the finger means is in the first position and engageable with the second side portion when the finger means is in the second position.

15. A fluid pressure power transmission comprising: fluid operated first motor means, fluid operated second motor means, first pump means for supplying fluid under pressure to the first motor means, first fluid circuit means connecting the first pump means to the first motor means, second pump means for supplying fluid under pressure to the second motor means, second fluid circuit means connecting the second pump means with the second motor means, means for concurrently operating the first and second pump means whereby said first and second pump means supply fluid under pressure to the first and second circuit means thereby operating said first and second motor means, said first and second pump means each having control means operable to vary the rate of flow of fluid discharged by the pump means, means connected to the control means of the first and second pump means operable to simultaneously actuate the control means of the first and second pump means to vary the output flow of fluid from said first and second pump means, and said means connected to the control means of the first and second pump means includes means operable in response to a difference in the pressure of the fluid in the first and second circuits to actuate the control means of the second pump means to alter the rate of flow of fluid discharged by said second pump means so as to substantially balance the pressure of the fluid in the first and second circuits thereby maintaining the torque and speed output of the first and second motor means substantially constant.

16. The power transmission of claim 15 wherein: the first motor means comprises a pair of fluid operated motors, said first circuit means being connected to said pairs of motors.

17. The power transmission of claim 16 wherein: each of said motors of the first motor means comprises a motor having positive displacement means.

18. The power transmission of claim 17 including: control means of each of said motors for adjusting the positive displacement means to vary the fluid output of each motor.

19. The power transmission of claim 18 including: a control unit operably connected to the control means for each of said motors, said control unit being operable to move the control means in a manner whereby the torque and speed output of each of said motors is substantially constant.

20. A fluid pressure power transmission comprising: fluid operated first pump means for supplying fluid under pressure to the first motor means, first fluid circuit means connecting the first pump means to the first motor means, second pump means for supplying fluid under pressure to the second motor means, second fluid circuit means connecting the second pump means with the second motor means, means for concurrently operating the first and second pump means whereby said first and second pump means supply fluid under pressure to the first and second circuit means thereby operating said first and second motor means, said first and second pump means each having control means operable to vary the rate of flow of fluid discharged by the pump means, means connected to the control means of one pump means operable to actuate the control means of the one pump means to vary the output flow of fluid from said one pump means, and means operable in response to a difference in the pressure of the fluid in the first and second circuits to actuate the control means of the other pump means to alter the rate of flow of fluid discharged by said other pump means so as to substantially balance the pressure of the fluid in the first and second circuits thereby maintaining the torque and speed output of the first and second motor means substantially constant, said means operable in response to a difference in pressure in the first and second fluid circuit means includes a piston and cylinder assembly connected to the control means of both pump means, and shuttle valve means connected to the first and second fluid circuit means and connected to the piston and cylinder assembly, said shuttle valve means operable to supply fluid under pressure to the piston and cylinder assembly when there is a difference in fluid pressure in the first and second fluid circuit means.

21. A control for a pump for moving fluid under pressure, said pump having an arm selectively movable to first and second positions to control the fluid flow from the pump comprising: housing means having a generally triangular opening, finger means located in said opening, means movably mounting the finger means on the housing means for selected movement to first and second positions, means operable to move said finger means to and from said first and second positions, first means connected to said arm, second means connected to the first means engageable with said finger means, and third means for moving the first and second means whereby the second means moves relative to the finger means causing the first means to move the arm to control the fluid flow from the pump.

22. The control of claim 21 wherein: said finger means has a generally triangular shape with diverging sides, said second means being engageable with one of said sides when the finger means is in the first position and engageable with the other side when the finger means is in the second position.

23. The control of claim 21 wherein: said means movably mounting the finger means on the housing means comprises pivot means pivotally connecting the finger means on the housing means whereby the finger means pivots to first and second positions.

24. The control of claim 21 wherein: said finger means has a generally triangular shape generally corresponding to the triangular shape of the opening in the housing means, said finger means having an apex portion located adjacent an apex portion of the opening, said apex portion being engageable with said housing means when the finger means is in the first position and second position.

25. The control of claim 24 wherein: said first means is a rod, said second means is a roller mounted on the rod located in the opening in the housing, said roller being engageable with the finger means to move said rod on operation of the third means.

26. The control of claim 25 wherein: said third means is a foot operated lever.

27. The control of claim 21 wherein: said finger means has an apex portion and diverging first and second side portions, said second means comprising roller means, said roller means engageable with the first side portion when the finger means is in the first position ane engageable with the second side portion when the finger means is in the second position.

* * * * *

UNITED STATES PATENT AND TRADEMARK OFFICE
CERTIFICATE OF CORRECTION

PATENT NO. : 4,369,855
DATED : January 25, 1983
INVENTOR(S) : Floyd E. Buschbom et al It is certified that error appears in the above-identified patent and that said Letters Patent is hereby corrected as shown below:

Column 4, line 25, "as" should be --at--.

Column 4, line 41, "fully" should be --full--.

Column 5, line 14, "Pumps" should be --Pump--.

Column 6, line 14, after "116", delete "are".

Column 11, last line, "of" (first occurrence) should be --on--.

Column 14, line 9, "ane" should be --and--.

Signed and Sealed this

Seventeenth Day of May 1983

[SEAL]

Attest:

DONALD J. QUIGG

Attesting Officer     Acting Commissioner of Patents and Trademarks